United States Patent [19]

Herscovici

[11] 4,205,162

[45] May 27, 1980

[54] POLYMER RECOVERY PROCESS

[75] Inventor: Eva J. Herscovici, Chappaqua, N.Y.

[73] Assignee: Stauffer Chemical Company, Westport, Conn.

[21] Appl. No.: 957,596

[22] Filed: Nov. 3, 1978

[51] Int. Cl.$^2$ .............................................. C08J 3/00
[52] U.S. Cl. .................................... 528/499; 528/176; 528/196; 528/272
[58] Field of Search ................ 528/176, 196, 272, 499

[56] References Cited

U.S. PATENT DOCUMENTS

| 3,532,677 | 10/1970 | Baron | 528/492 |
|---|---|---|---|
| 3,684,783 | 8/1972 | Lauck | 528/500 |
| 3,772,252 | 11/1973 | Blunt | 528/491 |
| 3,847,886 | 11/1974 | Blunt | 528/491 |
| 3,954,713 | 5/1976 | Schnöring et al. | 528/491 |
| 4,038,477 | 7/1977 | Inoue et al. | 528/487 |
| 4,089,843 | 5/1978 | Rausch | 528/492 |

Primary Examiner—Lucille M. Phynes
Attorney, Agent, or Firm—Richard P. Fennelly

[57] ABSTRACT

Polymer product, such as a polyester resin, is recovered in finely divided form from a polymer product/solvent solution by the addition of the solution to a hot, non-boiling water phase with non-shearing agitation of resulting composition of the water, polymer product, and solvent under conditions which give rise to turbulence in the composition. The solvent, which has a lower boiling point than the temperature at which the hot water is maintained, boils off from the polymer product, solvent, and water composition and leaves the desired, finely divided, polymer product admixed in the water phase. The product can be recovered by filtration or other suitable separation technique.

10 Claims, No Drawings

POLYMER RECOVERY PROCESS

BACKGROUND OF THE INVENTION

1. Field of the Invention

The present invention relates to a process for removal of a polymer product in finely divided form from a viscous solution of polymer product and inert organic solvent.

2. Description of the Prior Art

Polymer products, for example, polyester resins, e.g., polycarbonate resins, can be formed by the polymerization of the appropriate monomeric reactants in an inert organic solvent. Such a polymerization reaction normally yields a viscous solution of polymer product and inert solvent from which the product needs to be isolated.

In U.S. Pat. No. 3,530,094 to H. Schnell et al., it is proposed at Col. 6, lines 44–59 that such a polymer product/inert solvent mixture be sprayed into an unstirred hot water solution to flash off the solvent with separation of the resin in finely divided form. Attempts to follow this approach have been unsuccessful since, in the absence of agitation of the hot water solution, the polymer product will form a film on the surface of the water and will not be produced in finely divided form.

U.S. Pat. No. 2,989,503 to B. P. Jibben proposes addition of the polymer product/inert solvent solution to water and a certain defined amount of dimethylbenzene, followed by evaporation of the solvent from the solution, apparently also without agitation being supplied thereto.

U.S. Pat. No. 3,842,052 to S. Gordini et al. relates to removal of hydrocarbon solvent from gummy polymers by adding a hydrocarbon solvent/polymer solution to boiling, rather than non-boiling water, with stirring.

Finally, U.S. Pat. No. 3,267,074 to N. V. Wood teaches recovery of polycarbonate polymer product from a solvent/polymer product solution by injection of the solution into a highly turbulent stream of polycarbonate non-solvent, e.g., hot water, maintained in a "shearing device". This reference at Col. 1, lines 24–52 and Col. 3, lines 7–34 specifically distinguishes a "shearing device" from a "mixing device" which is said to merely "agitate" or "mix" the components of the solution and lead to production of the product in an "undesired fibrous form", rather than a more "granular" form. The use of such "shearing" agitation, rather than the lower speed "non-shearing" or "mixing" agitation, involves the use of specialized agitation equipment and the expenditure of relatively large amounts of energy. It is not preferred for these reasons.

SUMMARY OF THE PRESENT INVENTION

The present invention is a process for the removal of polymer product, in finely divided form, from a solution of the polymer product and an inert solvent. The polymer product/inert solventsolution is added to a hot, non-boiling, water solution which is held at a temperature equal to or greater than the boiling point of the solvent and which is agitated under "non-shearing", rather than "shearing", conditions which nevertheless give rise to turbulence in the mixture. The solvent boils off from the solution when brought into contact with the agitated, hot, non-boiling water, and the polymer product becomes suspended in the water phase in finely divided form. The polymer product can be removed from the water by filtration or other suitable means.

DESCRIPTION OF PREFERRED EMBODIMENTS

The polymer product/inert organic solvent solution which is to be treated in accordance with the present invention comprises a polymer product and an inert organic solvent as its major constituents. This type of solution is the effluent from the polymerization reaction which is carried out in an inert organic solvent medium. The weight ratio of polymer product to solvent will generally range from about 1:20 to about 1:5 in such solutions. The solutions may also contain, as other ingredients, small amounts of residual monomer or monomers, initiator, molecular weight regulators, buffers, and other additives commonly used to affect the desired polymerization of the desired monomers in such an inert organic solvent.

The process of the present invention is broadly applicable to the recovery of a wide variety of polymer products from such solutions. The polymer product is one which is non-hydrolyzed in water under the temperature conditions described below and which has a substantial degree of solubility in the solvent. Representative polymer products which can be contained include polyester resins which are formed by the reaction of a diphenol and/or glycol and a diacid. The polyesters formed from an aromatic diphenol reactant are a preferred representative class of polyester resin. Also encompassed by the term "polyester" are polycarbonate-type resins which are linear polyesters of carbonic acid and which are formed by the condensation polymerization of a diphenol, such as bisphenol A, and a carbonate precursor, such as phosgene, as major monomeric constituents.

The inert organic solvent which forms the other major constituent of the polymer product/inert organic solvent solution is one which will dissolve the polymer product and which has a boiling point below the temperature at which the hot, non-boiling water is maintained in the present process. Generally, the boiling point of the solvent is below 100° C., preferably below about 80° C., although if the heating of the water suspension is carried out under superatmospheric pressure, solvents having a higher boiling point may be used. Such higher boiling solvents, however, are not preferred due to the extra expenditure of energy needed to heat the water and maintain the superatmospheric pressure. Representative solvents which are useful in the present invention include the aliphatic hydrocarbons, cycloaliphatic hydrocarbons, ketones, aromatic hydrocarbons, and halogenated derivatives of said hydrocarbon solvents which boil below about 100° C., and above ambient temperature, e.g., above about 25° C., so as to remain liquid. Some suitable solvents, with their respective boiling points being expressed in parenthesis are: methylene chloride (40.2° C.); ethylene chloride (83.5° C.); heptane (98.4° C); hexane (68.7° C.); pentane (36.1° C.); cyclohexane (80.7° C.); benzene (80.1° C.); chloroform (61.2° C.); and the like.

The polymer product/inert organic solvent solution is added to the hot, non-boiling water solution under conditions of sufficient, non-shearing agitation and turbulence within the solution to both: (1) effect removal of the solvent from the mixture, by boiling of the solvent; and (2) to yield a slurry of water and "finely divided" polymer product. The term "finely divided" as used herein is intended to cover the polymer product in a form which allows its direct feeding to such fabrication equipment as pelletizers, extruders, and the like. The product can be either in granular or flake form as contrasted to the fibrous or wool-like form described at Col. 1, lines 24–52 or Col. 5, line 51 to Col. 6, line 6 of U.S. Pat. No. 3,267,074 to N. V. Wood.

It is an important feature of the present invention that the non-shearing, or mixing, agitation is carried out in an appropriate mixing vessel which is of a construction which affords a sufficient degree of turbulent, non-laminar flow of the mixture of solvent, polymer product, and water to yield the desired finely divided polymer product, rather than the undesired fibrous, wool-like product discussed in the above-mentioned Wood patent. This desired degree of turbulence can be provided by means known to the person of ordinary skill in the art by placing in the inside of the mixing apparatus some type of obstruction to the normally, smooth, non-turbulent, laminar flow that would otherwise be produced by the use of such a non-shearing agitation apparatus. For example, the interior sides of the apparatus can carry inwardly facing projections, for example, as provided by the standard "Morton" laboratory flask, or one or more suitably dimensioned baffles can be inserted into the apparatus to break up the normal laminar flow of the solution and provide the necessary degree of turbulence.

The non-shearing agitation that is applied to the solution, in accordance with the present invention, is below the minimum value of 2000 r.p.m. specified in U.S. Pat. No. 3,267,074 to N. V. Wood. Generally, the agitation speed in a preferred embodiment will range from about 200 to 700 r.p.m., and the agitation will be conducted in a conventional mixing apparatus, as contrasted to the shearing devices specified for use by the Wood patent.

Both the agitation rate, rate of addition of the solvent/polymer product solution, the degree of obstruction in the mixing apparatus to provide turbulent flow, and the temperature of the non-boiling hot water can be varied to obtain the desired physical form for the product. Generally, the use of higher rates of addition, less vigorous agitation, less obstructions to give a correspondingly less turbulent flow, and a lower temperature for the water will lead to a lesser degree of sub-division for the product. The use of lower rates of addition, more vigorous agitation, more obstructions to give a more turbulent flow, and a higher temperature for the water will give a greater degree of subdivision for the product. Generally, addition of 0.2% to about 1%, by volume of the hot water solution, of the solvent/polymer product solution per minute will be adequate under the agitation rates described above.

The precipitated, finely divided product can then be removed from the aqueous phase by any of the separation techniques that are used to recover a precipitate from a supernatant solution. Examples of such techniques include filtration, centrifugation. decantation, and the like.

The present invention is described in the Examples which follow.

(COMPARATIVE) EXAMPLE 1

This Example is presented to illustrate that the spraying of a polycarbonate/methylene chloride solution into hot water, without stirring of the water, will not yield the product in finely divided form. This process is described in U.S. Pat. No. 3,530,094 to H. Schnell et al. at Col. 6, lines 44–59.

A 5%, by weight, solution of a conventional polycarbonate resin (LEXAN 101 from General Electric Company) in methylene chloride solvent was prepared by dissolving the polycarbonate in the solvent. Water was then placed in an open Petri dish and was heated to a temperature of from about 83° C. The polycarbonate/methylene chloride solution was then sprayed into the hot water solution, which was not stirred, with the aid of an aerosol propellant. A continuous film, rather than finely divided flakes, of polycarbonate formed on the surface of the water. This film formed on the surface of the water regardless of whether the spray was gently directed at the water solution or was more vigorously directed at the water in an attempt to push it below the surface of the water. No finely divided, powdery product could be removed from the polycarbonate/methylene chloride solution.

EXAMPLE 2

This Example illustrates use of the process of the present invention to recover a copoly(carbonate/phosphonate) polymer from solution.

A copoly(carbonate/phosphonate)polymer was formed by reacting a monomer charge comprising about 58.55%, by weight, of bisphenol A, about 10.0%, by weight, of tetrachlorobisphenol A, about 24.5%, by weight, phosgene, about 6.0%, by weight, benzene phosphorus oxydichloride, about 0.20%, by weight, phosphorus oxytrichloride and about 0.7%, by weight, of para-t-butyl phenol in a methylene chloride solvent containing a triethylamine acid acceptor (about 113%, by weight, based on the weight of bisphenols). This copoly(carbonate/phosphonate)/methylene chloride solution was then processed, as described below, to recover the polymer in the form of a finely divided, powdery product.

A 5000 ml. "Morton" flask was equipped with a stirrer, condenser, addition funnel, thermometer, and heating mantle. To this flask was charged 2500 ml. of distilled, deionized water, and the heating mantle was turned on to heat the water. When the temperature of the water reached 80–82° C., the stirrer was turned on so that it agitated the water at about 350 to about 400 r.p.m. The copoly(carbonate/phosphonate)/methylene chloride solution (15%, by weight, of polymer to unit volume of solution) was then added dropwise from the addition funnel at the rate of about 7–8 ml. per minute. The methylene chloride (boiling point=40.2° C.) distilled off when it contacted the water, and the polymer formed a slurry of finely divided particles in the water. The slurry of polymer particles and water was filtered, and the polymer product was isolated therefrom in the form of light, fluffy flakes.

EXAMPLE 3

This Example illustrates the use of the process of the present invention to recover a polyester resin, in finely divided form, from the inert organic solvent solution containing it.

To a 1000 ml. Morton flask, equipped as in Example 2, was charged 400 ml. of deionized, distilled water which was heated and maintained at a temperature of about 80° to about 83° C. As the water was stirred at an agitation rate of about 450 r.p.m., a 5% (wt./vol.) solution, in methylene chloride, of a copolyester made from tetrachlorobisphenol A, isophthaloyl chloride and adipyl chloride (respective molar ratios: 1 to 0.4 to 0.6) was added dropwise to the solution at the rate of about 4 ml./min. The methylene chloride distilled off leaving the polyester product in the remaining aqueous phase in finely divided form as fluffy particles forming a slurry.

EXAMPLE 4

This Example illustrates the use of the process of the present invention to recover a polycarbonate resin, in finely divided form, from the inert organic solvent solution containing it.

Using the same apparatus and procedure described in Example 3, a 7.5% (wt./vol.) solution of polycarbonate resin (LEXAN 101, from General Electric Company) in methylene chloride was added in dropwise fashion to hot (80-83° C.) water at the rate of about 4 ml./min. while the solution was being stirred at about 450 rpm. The methylene chloride distilled off leaving the polymer product in the aqueous phase in finely divided form as small particles.

EXAMPLE 5

This Example illustrates the use of the process of the present invention to recover another type of polyester resin, in finely divided form, from the inert solvent solution containing it.

Using the same apparatus and procedure described in Example 3, a 10% (wt./vol.) solution, in methylene chloride, of a polyester made by reacting equal molar amounts of neopentyl glycol, bisphenol A, isophthaloyl chloride, and terephthaloyl chloride was added in dropwise fashion to hot (80-83° C.) water at the rate of about 2.5 ml./min. The solution was stirred at about 400 r.p.m. during the addition of the polyester/solvent solution, and methylene chloride distilled off with the polymer product forming small granular particles in the aqueous phase.

EXAMPLE 6

This Example illustrates the use of the process of the present invention to recover another type of polyester resin from the inert organic solvent solution containing it.

The same apparatus and procedure used in Example 3 was utilized. A 5% (wt./vol.) solution, in methylene chloride, of a polyester formed by reacting equal molar amounts of bisphenol A and adipoyl chloride was added dropwise to hot (80°-83° C.) water at the rate of about 6.5 ml./min. The water was stirred at about 450 r.p.m., and the methylene chloride distilled off. The polymer product formed small, finely divided particles in the aqueous phase.

(COMPARATIVE) EXAMPLE 7

This Example is presented to illustrate that at certain slow addition rates of solution to the hot water, a finely divided product is not recovered if the temperature of the hot water is maintained at too low a temperature.

To a 2000 ml. Morton flask equipped as in Example 2 was charged 800 ml. of distilled water. The water was heated to a temperature of about 60° C. and was stirred at the rate of about 350 to 400 r.p.m. A 10% (wt./vol.) solution of the copoly(carbonate/phosphonate) resin of Example 2 in methylene chloride was added dropwise to the stirred hot water solution at the rate of about 4 ml./min. by means of an addition funnel. The solvent distilled off, and the polymer remained suspended in the aqueous layer in large lumps.

The foregoing Examples should not be construed in a limiting sense. The scope of protection that is desired is given in the claims which follow.

What is claimed:

1. A process for the removal, in finely divided form, of a polymer product from a solution consisting essentially of an inert organic solvent having a boiling point temperature below the boiling point temperature of water and polymer product, said process comprising adding said solution to a non-boiling, hot water solution under conditions of sufficient, non-shearing agitation and turbulence to effect removal of the solvent from the solution, by boiling off of the solvent, with production of a slurry of water and finely divided polymer product.

2. A process as claimed in claim 1 wherein the polymer product is a polyester resin.

3. A process as claimed in claim 1 wherein the solvent has a boiling point of below about 100° C.

4. A process as claimed in claim 1 wherein the solvent has a boiling point of from about 25° C. to about 100° C.

5. A process as claimed in claim 1 wherein the solvent is an inert hydrocarbon solvent or its chlorinated derivative.

6. A process as claimed in claim 1 wherein the weight ratio of polymer to solvent in the mixture ranges from about 1:20 to about 1:5.

7. A process as claimed in claim 1 wherein the solvent is methylene chloride.

8. A process as claimed in claim 2 wherein the solvent is methylene chloride.

9. A process as claimed in claim 1 wherein from about 0.2% to about 1%, by volume of the hot water solution, of solution is added to the water per minute.

10. A process as claimed in claim 1 wherein the agitation ranges from about 200 to about 700 r.p.m.

* * * * *

UNITED STATES PATENT AND TRADEMARK OFFICE
CERTIFICATE OF CORRECTION

PATENT NO. : 4,205,162
DATED : May 27, 1980
INVENTOR(S) : Eva J. Herscovici

It is certified that error appears in the above-identified patent and that said Letters Patent are hereby corrected as shown below:

Col. 4, line 8, -- to about 85°C. -- should appear after "from about 83°C."

Signed and Sealed this

Fourth Day of November 1980

[SEAL]

Attest:

Attesting Officer

SIDNEY A. DIAMOND

Commissioner of Patents and Trademarks